United States Patent
Lohse et al.

(10) Patent No.: US 12,180,924 B2
(45) Date of Patent: Dec. 31, 2024

(54) METHOD FOR CREATING A TRANSITION FROM AN EDGE OF AN ADD-ON PART MOUNTED ON THE OUTER SURFACE OF A ROTOR BLADE

(71) Applicant: Siemens Gamesa Renewable Energy A/S, Brande (DK)

(72) Inventors: Hartwig Lohse, Breitenberg (DE);
Giridhar Ramanujam, Brande (DK);
Ane Kold di Gennaro, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 394 days.

(21) Appl. No.: 17/435,558

(22) PCT Filed: Mar. 9, 2020

(86) PCT No.: PCT/EP2020/056259
§ 371 (c)(1),
(2) Date: Sep. 1, 2021

(87) PCT Pub. No.: WO2020/182763
PCT Pub. Date: Sep. 17, 2020

(65) Prior Publication Data
US 2022/0186706 A1 Jun. 16, 2022

(30) Foreign Application Priority Data
Mar. 8, 2019 (EP) .................................. 19161709

(51) Int. Cl.
*B29C 65/48* (2006.01)
*B29C 65/52* (2006.01)
(Continued)

(52) U.S. Cl.
CPC ........ *F03D 1/0675* (2013.01); *B29C 65/4855* (2013.01); *B29C 65/4865* (2013.01);
(Continued)

(58) Field of Classification Search
CPC ............... F03D 1/0675; B29C 65/4855; B29C 65/4865; B29C 65/52; B29K 2105/0097;
(Continued)

(56) References Cited

U.S. PATENT DOCUMENTS

| 3,676,888 A | 7/1972 | Akers |
| 10,717,107 B2 | 7/2020 | Bons et al. |

(Continued)

FOREIGN PATENT DOCUMENTS

| CN | 106000715 A | 10/2016 |
| CN | 107454912 A | 12/2017 |

(Continued)

OTHER PUBLICATIONS

PCT International Search Report & Written Opinion mailed Jul. 21, 2020 corresponding to PCT International Application No. PCT/EP2020/056259.

*Primary Examiner* — Lee A Holly
(74) *Attorney, Agent, or Firm* — Schmeiser, Olsen & Watts LLP

(57) ABSTRACT

A method for creating a transition from an edge of an add-on part mounted on the outer surface of a rotor blade, including the steps:
delimiting an application area on the rotor blade surface and the add-on part to be covered by a sealant compound with a thin and smooth masking tape;
dispensing of the sealant on the application area;
distribution of the sealant;
removing the masking tape; and
smoothening of a sealant transition step with a flexible tool, is provided.
A wind turbine rotor blade is also provided.

12 Claims, 4 Drawing Sheets

(51) Int. Cl.
*B29L 31/08* (2006.01)
*F03D 1/06* (2006.01)
*B29K 105/00* (2006.01)
*B29K 105/16* (2006.01)

(52) U.S. Cl.
CPC ...... *B29C 65/52* (2013.01); *B29K 2105/0097* (2013.01); *B29K 2105/16* (2013.01); *B29K 2995/0073* (2013.01); *B29K 2995/0077* (2013.01); *B29K 2995/0098* (2013.01); *B29L 2031/085* (2013.01); *F05B 2230/23* (2013.01); *F05B 2240/303* (2020.08); *F05B 2240/306* (2020.08); *F05B 2250/62* (2013.01)

(58) Field of Classification Search
CPC ........ B29K 2105/16; B29K 2995/0073; B29K 2995/0077; B29K 2995/0098; B29L 2031/085; F05B 2230/23; F05B 2240/303; F05B 2240/306; F05B 2250/62; F05B 2230/10; F05B 2230/30; F05B 2230/90; F05B 2240/305; F05B 2240/3062; F05B 2240/57
See application file for complete search history.

(56) References Cited

U.S. PATENT DOCUMENTS

| | | | |
|---|---|---|---|
| 11,939,947 B2* | 3/2024 | Ramanujam | F03D 1/0675 |
| 2004/0006944 A1 | 1/2004 | Miyamoto | |
| 2004/0187396 A1* | 9/2004 | Higgins | E04F 19/045 |
| | | | 52/302.6 |
| 2008/0226905 A1* | 9/2008 | Dollase | C09J 7/20 |
| | | | 427/208.4 |
| 2013/0108457 A1 | 5/2013 | Thrue et al. | |
| 2013/0323070 A1* | 12/2013 | Grabau | F03D 1/0675 |
| | | | 29/889.7 |
| 2015/0225967 A1 | 8/2015 | Rampling | |
| 2017/0016426 A1* | 1/2017 | Kuhn | F03D 80/30 |
| 2017/0314532 A1* | 11/2017 | Kirkegaard | C08G 18/7671 |
| 2018/0272375 A1 | 9/2018 | Trend et al. | |

FOREIGN PATENT DOCUMENTS

| | | |
|---|---|---|
| EP | 3144525 A1 | 3/2017 |
| EP | 3620648 A1 | 3/2020 |
| JP | 2002233811 A | 8/2002 |
| JP | 2006098182 A | 4/2006 |
| WO | 2018051153 A1 | 3/2018 |

* cited by examiner

METHOD FOR CREATING A TRANSITION FROM AN EDGE OF AN ADD-ON PART MOUNTED ON THE OUTER SURFACE OF A ROTOR BLADE

CROSS-REFERENCE TO RELATED APPLICATIONS

This application is a national stage entry of PCT Application No. PCT/EP2020/056259 having a filing date of Mar. 9, 2020, which claims priority to European Patent Application No. 19161709.1, having a filing date of Mar. 8, 2019, the entire contents of which are hereby incorporated by reference.

FIELD OF TECHNOLOGY

The following relates to a method for creating a transition from an edge of an add-on part mounted on the outer surface of a rotor blade, i.e. providing an edge seal for a rotor blade add-on or a method of edge sealing for wind turbine blades. Especially, the following relates to an aerodynamic edge sealing for steps on the surface of wind turbine blades and a method for applying such edge sealing.

BACKGROUND

The aerodynamic performance of wind turbine rotor blades is highly sensitive to surface imperfections, especially to those that lie in close proximity to the leading edge of the rotor blade. This presents a challenge when a step or an obstacle is present on the rotor blade surface, for example following the application of a leading edge protection (LEP) cover (also referred to as erosion protective cover) and/or a vortex generator (VG) panel, a trailing edge (TE) panel, e.g. a serrated trailing edge panel, a spoiler mounted on panels and placed on a surface of a blade, etc. LEP covers are also referred to as erosion protective covers or LEP shells. Steps or obstacles which occur on the surface due leading edge protection are especially an issue for more intrusive solutions like protective covers or protective tapes attached onto the surface of a blade.

A sharp step may be present at the edges of a panel or cover e.g. a leading edge protective cover, attached to the rotor blade. Such an abrupt height difference causes the air flow to transition from laminar to turbulent, which will adversely impact the annual energy production (AEP) of the wind turbine and may also contribute to wind turbine noise.

It is known from the prior art to grind the edge of an already-mounted add-on into a ramp or slope in order to reduce the AEP (annual energy Production) impact. However, such a grinding procedure is time-consuming and cost-intensive. In addition, it is difficult to obtain a uniform edge along the entire edge of the add-on, e.g. cover or plate or panel, and there is a risk of grinding into the rotor blade itself. The grinding procedure may also be difficult to perform, since the material of the add-on may be flexible and accordingly difficult to grind.

Another way of reducing turbulence arising from a step along the edge of an add-on is to manufacture the add-on with a thin edge. However, mounting an add-on such as a LEP cover with a long thin edge may result in wrinkling along the edge, which contributes to non-conformance cost and reduces aerodynamic performance.

In another approach, an add-on such as an LEP shell may be manufactured to fit into a built-in recess on the blade surface. However, this approach is associated with strict requirements regarding production tolerances and quality, and significantly increases manufacturing costs while also being more prone to defects.

It is further known to seal the edges of a leading edge protection tape. The purpose of this sealing is to smooth and protect the tape edges. No aerodynamic performance claims have been made with such a tape sealing.

SUMMARY

It is therefore an aspect of the present invention to provide a way of overcoming the negative influence of an add-on to the aerodynamic performance of a rotor blade.

This is achieved by the method for creating a transition from an edge of an add-on part mounted on the outer surface of a rotor blade, and by the wind turbine rotor blade.

As said above, shell or panel edges when mounted on a blade, create a transition step between e.g. shell and blade surface. This will lead to disturbance of the air flow across the blade, thus accordingly induce a drop in aerodynamic performance and the possible generation of noise. In order to preserve the optimal performance and lower acoustic impact of such a transition step, a smooth surface finish is required at such interfaces.

The method according to the present invention for creating a transition from an edge of an add-on part mounted on the outer surface of a rotor blade, especially for providing such a smooth surface finish, comprises the following steps:

delimiting an application area on the rotor blade surface and the add-on part to be covered by a sealant compound with a thin and smooth masking tape,
dispensing of the sealant on the application area,
distribution of the sealant,
removing the masking tape,
smoothening of a sealant transition step with a flexible tool.

As it will be further explained below, the term "sealant" could also be read as "adhesive".

The method comprises use of the following tools by example:

A tooth spatula, of a flexible material, for levelling the sealing agent or adhesive sealant material after it has been dispensed to the sealed application area on the blade/plate (add-on).

A second spatula e.g. of a flexible material characterized by a Shore A hardness of 30 to 80, of 40-60, e.g. a silicone material, with a cross-section profile adapted to the application. A low energy surface (surface free energy) preventing adhesion of the sealing material would offer further advantages but is not a prerequisite. The angle between the soft spatula and the blade surface at the point of contact with the blade surface (during use) should (will) be lower than in the case of a hard spatula.

The application process is designed to minimize and ideally prevent an AEP loss due to a step between blade surface and the attached and bonded cover/plate.

Thus the method for creating such transition from an edge of a plate/cover (add-on) to the blade surface comprise the following steps:

Delimiting the area on the blade surface and plate/cover (add-on) to be covered by the adhesive/sealant compound with a thin and smooth masking tape e.g. with a thickness less than 0.2 mm.
Dispensing of the adhesive/sealant, e.g. by bead or spray application or by roll application or using the so called "swirl" process. By example, application of an adhesive/sealant in a serpentine line overlapping transition (25/50 or 20/50) on both plate/cover (add-on) and blade surface and in a straight line along the plate/cover (add-on) and/or on the blade surface.

Adhesive/sealant distribution e.g. using a flexible toothed spatula. (optional) Smoothening the adhesive/sealant with a flexible tool moved in the longitudinal direction of the blade. The tool is designed to meet the profile of the blade e.g. with a curvature that matches that of blade leading edge profile.

Removal of the masking tape.

Smoothening of the adhesive/sealant transition step with a (flexible) tool, e.g. the same as two steps above, after removing the masking tape. This is leading to a further reduced step height between adhesive/sealant and blade surface.

Accordingly, a wind turbine comprising blades with attached add-ons thereon such as plates/covers (add-ons) will benefit, e.g. performance wise, if the plates/covers (add-ons) are mounted on the blades with the edge sealing described herein i.e. using the edge sealing design and method for its creation.

Thus, the present invention describes a method of providing an edge seal along a longitudinal edge of an add-on part mounted on the outer surface of a rotor blade.

Additionally, the inventors of the present invention have found out that a width of the sealing set between 2 to 5 millimeters is not sufficient to achieve the before mentioned improvements of aerodynamic performance of the wind turbine and have provided other ranges according to their finding.

For example, a flexible protective cover having a finite thickness is applied on the leading edge, but the general idea applies to any kind of step on the surface of a wind turbine blade, e.g. vortex generator panels, trailing edge panels or trailing edge covers, sensors mounted on a plate etc.

In the context of the present invention, the longitudinal edge at the add-on part may be assumed to have the appearance of an abrupt step. There is no need to manufacture the add-on to have a progressively thinner longitudinal edge when it is to be mounted to a rotor blade using the inventive method, so that manufacture of such add-ons can be favourably economical. Since the add-on part is generally attached or bonded to the rotor blade in some way, for example by an adhesive bonding layer, especially including double-sided pressure sensitive tape, the height at the longitudinal edge of the add-on part may be assumed to comprise the height of the add-on at that longitudinal edge, as well as the height of any adhesive layer for bonding the add-on to the rotor blade.

A major aspect in all embodiments is the extent of the edge.

In theory it could have a very long extent on a flat surface, but realistically there is a limitation on how long the extent can be as it obviously becomes thinner and thinner away from the shell edge.

The improved step finish solution minimizes AEP loss potentially to a negligible impact and reduces also significantly any noise generated when the rotor blade is in operation compared to a rotor blade having no edge sealing.

The edge seal width may be understood to extend outward from the longitudinal edge of the add-on. Since the edge seal width is significantly larger than the add-on height, the improved edge seal favorably reduces or even eliminates AEP losses associated with the add-on. The edge seal obtained by the inventive method also significantly reduces noise generation of wind turbine blade while the wind turbine is in operation, compared to a rotor blade not provided with such edge sealing along a part such as an LEP cover.

The inventive method may be used during manufacturing of a wind turbine rotor blade and also when maintaining, repairing or upgrading an already installed rotor blade, e.g. for attachment of leading Edge Protection covers and/or vortex generator panels, trailing edge panels, e.g. serrated trailing edge panels, or spoilers mounted on panels and placed on a surface of a blade as a retrofit solution of existing blades. The inventive method is equally applicable to existing blade add-ons, for which the contribution to AEP will improve when provided with the inventive edge sealing.

According to the present invention, the wind turbine rotor blade comprises at least one add-on part mounted to the outer surface of the rotor blade, and such an "extended" edge seal, as described above, formed along at least one longitudinal edge of the add-on part.

A wind turbine rotor blade according to the present invention comprises at least one add-on part mounted to the outer surface of the rotor blade, and an edge seal formed with a method according to the present invention.

To summarize, the present invention relates to a wind turbine blade including a protective cover or plate or panel or other kind of add-ons that are attached to the surface of the blade, especially along the longitudinal extension of the blade. The add-ons are typically attached by an adhesive. An edge sealer is placed at an outer edge of the add-on (cover, panel, plate) onto the surface of the blade, either overlapping the add-on or not.

In this description, without restricting the present invention in any way, the term "add-on" may be understood to mean any of a protective cover, a plate or panel attached to the surface of the blade, especially along the longitudinal extension of the blade. The terms "edge sealing" and "edge seal" may be used interchangeably.

Whether or not the sealant material is formed to overlap the add-on edge or step, the sealant material may be applied using a tool set comprising a number of spatulas with different properties. In an exemplary embodiment of the present invention, the step of forming an edge seal comprises a step of depositing sealant material at least onto the surface of the rotor blade alongside the longitudinal edge of the add-on part. Then, a preliminary spatula is used to spread the sealant material in a region delimited by the longitudinal edge of the add-on part and the chosen edge seal width. The preliminary tool has a flexibility and shape that facilitates the initial spreading of the sealant.

In a subsequent step, a refining spatula is used to refine the shape of the sealant spread by the preliminary tool. The refining tool has a lower hardness than the preliminary tool.

A refining spatula comprises a number of grooves running parallel to the tip of the spatula (perpendicular to the direction of smoothening), particularly on the side where the spatula is intended to have contact with the sealing material. At least one groove is in the front half of the spatula, the half where the contact area is located. These grooves have the advantage that the spatula is rigid in the direction of the grooves but may easily bend when sweeping over a surface. For a better grip, a refining spatula has two fins at the opposite end of the tip, wherein the fin at the side of the contact area is thinner than the fin at the other side. The back half of the spatula, i.e. the part where the spatula is held, may be more rigid than the other part and may especially comprise another material than the other part.

The inventive method can include a step of delimiting the area of the intended edge seal using a smooth, thin masking tape. One tape may extend along the outer edge of the intended edge seal, at a distance outward from the edge step. This distance is at least 20 times larger than the edge step height. The thickness of the tape is as small as possible, at most 0.2 mm. The other boundary of the edge seal may be defined by the edge step. Alternatively, if an overlap is to be formed over the edge step, a second tape may be applied to the surface of the add-on, parallel to the longitudinal edge of the add-on. The sealant is then applied within these bounds. The sealant can initially be roughly deposited on the rotor blade (and add-on), for example in the form of a bead from a dispenser nozzle, by spraying or another suitable method. The roughly applied sealant is then spread using a preliminary shaping tool, for example a flexible toothed spatula.

Thus, according to an exemplary method, the distribution of the sealant is achieved by using a toothed spatula, of a flexible material, for levelling the sealant after it has been dispensed to the application area, wherein the teeth of the toothed spatula have a distance between 1 to 2 mm and/or a height between 0.2 to 5 mm.

The spreading can be done by guiding the toothed spatula in the longitudinal direction of the rotor blade surface, between the edge seal bounds. After this preliminary step is complete, the tape or tapes are removed. The still-liquid sealant is then smoothed to its final shape by drawing a softer, flexible spatula over the spread sealant. This refining or smoothing step with the second tool serves to further decrease the height of the "wedge" of the edge seal between the edge step and the outer boundary of the edge seal. The second flexible spatula is made of a material such as silicone to ensure a relatively low Shore A hardness, for example 50±10.

According to an exemplary method, the flexible tool is a second spatula, with a Shore A hardness between 30 and 70, especially between 40 and 60, especially between 48 and 52. A Shore A hardness is bigger than 30, particularly bigger than 40, especially more than 45 and/or a Shore A hardness is smaller than 70, particularly smaller than 60, especially less than 55.

According to an exemplary method, the flexible tool comprises a silicone material, with a cross-section profile adapted to the application and a low energy surface preventing adhesion of the sealing material.

According to an exemplary method, the flexible tool comprises a tip where there is the intended contact area with the sealant, and a number of grooves running parallel to the tip (perpendicular to the direction of smoothening). These grooves have the advantage that the refining spatula is rigid in the direction of the grooves but may easily bend when sweeping over a surface. For a better grip, a refining spatula has two fins at the opposite end of its tip, wherein the fin at the side of the contact area is thinner than the fin at the other side.

According to an exemplary method, the masking tape has a thickness less than 0.2 mm. That has the advantage that during the finishing step the edge of the sealant to be minimized is small.

According to an exemplary method, the dispensing of the sealant is achieved by bead or spray application, by application of the sealant in a serpentine line overlapping transition, especially 25/50 or 20/50, on both, add-on and blade surface, or in a straight line on the add-on and/or the blade surface.

According to an exemplary method, after distribution of the sealant and before removing the masking tape, the sealant is smoothed with a tool, the flexible tool (as mentioned above), moved in the longitudinal direction of the blade, wherein the tool is designed to meet the profile of the blade, especially with a curvature that matches that of the blade leading edge profile.

A sealing agent (sealant) or an adhesive is used to form the edge seal along one or more edges (edge steps) of the add-on, either with or without an overlap as will be explained in the following. The geometry of the edge sealing is tuned and optimized in order to reduce the aerodynamic impact of the step due to the interfacing surfaces, i.e. a leading edge solution. The terms "sealant", "edge sealer" and "sealing agent" may be used to refer to such an adhesive. The adhesive used for fixing an add-on comprises the same material as the edge sealer or the other way round. Thus, the sealant can be an adhesive, however, this is not necessary in every case. In this application, the term "sealant" also includes the term "adhesive".

The seal is formed using a specific liquid sealant (especially an adhesive material) that solidifies sometime after application and which, when liquid, has a specific rheology, especially an adhesive viscosity, that offers a good balance between sag resistance and flowability. Rheological properties and the specific viscosity of the sealant is tailored to the particular geometry and position of the seal. On the one hand, the viscosity must be sufficiently low to allow the sealant to spread easily and to run off any streaks that may occur during spreading. Yet on the other hand, the yield point (sag resistance) of the sealant must be high enough to avoid a gravity-induced run-off of the sealant, which would adversely affect the contour of the seal created by the application process.

The solidified sealant is (highly) flexible, abrasion-resistant, and adheres well to the surface to which it is applied and as well has a good resistance to UV-exposure.

In general, any liquid sealant material solidifying after application either by a physical process, a chemical reaction or a combination of both is suitable for the purpose of this present invention. Reactive two component sealants are due to their faster cure response and the resulting faster process. Physically hardening sealants like a hot melt sealant that becomes firm upon cooling and/or sealants curing by a chemical reaction may be used. From the group of chemically curing sealants two part sealants are preferred due to their faster cure response and the resulting faster process.

It is preferred to use a sealant with a solidification speed (open time) that allows on the one hand a sufficient time for the application process, i.e. dispensing, levelling and creation of the contour in accordance with this present invention. On the other hand, in the interest of short process times, a fast cure allowing further processing as quickly as possible is preferred. Here, in particular chemically crosslinking two-component adhesives offer advantages, especially since their cure can be accelerated by moderate heating, e.g. by means of IR emitters, after the contour according to the present invention has been formed, allowing a further process times reduction.

Exemplary materials may be epoxy, polyurethane, polyurea, silicone, silane modified polymers (SMP), methylmethacrylate (MMA) and hybrid solutions, chosen in view of the desired properties in the liquid and cured state, especially of sag resistance and flowability, as indicated above. For example, a sealant material may be chosen to have a specific adhesive viscosity offering a good balance between sag resistance and flowability, as well as a favorably high degree of flexibility in its cured state offering a high fatigue resistance. The integrity of an edge seal formed along the longitudinal edges of an LEP using such a material will not suffer from repeated torsional bending of the rotor blade.

A two-component sealing material is used, where the two components are mixed immediately prior to the application on the surface of the blade by means of a static or dynamic mixer, wherein the viscosity of the two components lie between 40.000-110.000 mPas for the first component and between 100.000-380.000 mPas for the second component. However, sealants showing different viscosities can also be suitable as long as the well balanced rheological properties are met.

A preferred sealant has a surface tension being lower than the surface free energy of the surfaces it is applied to in order to allow, as prerequisite for the formation of adhesion a sufficient wetting of such surfaces. An increase of the surfaces free energy by suitable methods, e.g. but not limited to cleaning, abrasion, application of a primer or adhesion promoter and activation methods, e.g. but not limited to plasma-, corona-, flame-, VUV (vacuum-ultraviolet) is explicitly part of the present invention. In addition to the above mentioned ability to wet the surfaces, a good adhesion of the adhesive/sealant to the surface of the blade and the respective add-ons is advantageous to fulfill the demanding requirements regarding service life, especially under the harsh conditions of offshore installations.

In addition to good adhesion, the mechanical properties of the sealant are of great importance. Both a high abrasion resistance to withstand rain erosion conditions and a sufficient fatigue strength to withstand the vibrations of the blade during operation are required. Thus, a preferred sealant has a sufficient resistance to peel forces occurring on the respective surfaces over the entire service life of the blade especially bigger than 2 N/mm. The test method for long-term resistance is e.g. the procedure described in ISO 20340.

Due to the wide range of possible applications of the sealing being subject of the present invention, with regard to the materials involved, the size of the respective add-ons and their position on the blade, the sealant is tailored to the respective application.

A preferred sealant has a tensile strength (acc. DIN EN ISO 527) of bigger than 4 MPa and/or smaller than 8 MPa, particularly 5 MPa±x<0.5 MPa, especially 5 MPa. After 1000 h at 80° C. the tensile strength may alter to about 9 MPa or bigger.

Alternatively or additionally, the elongation at break (acc. DIN EN ISO 527) is bigger than 80% and/or smaller than 130%, particularly 90%±x<5%, especially 90%. After 1.000 h at 80° C. the elongation at break may alter to a value of 100% or bigger.

Alternatively or additionally, the Young's Modulus (acc. DIN EN ISO 527) is bigger than 8 MPa and/or smaller than 15 MPa, particularly between 9 to 13 MPa, especially 11 MPa. After 1.000 h at 80° C. the Young's Modulus may have a value of 11 MPa or bigger.

The exposure to 80° C. for 1000 hours refers to an accelerated aging test to mimic higher blade surface temperature as a result of air temperature and sunlight irradiation during the turbines life time. The maximum surface temperature under real life off-shore conditions is estimated as 60° C. The sealant is chosen such that the mechanical properties (Young's modulus, tensile strength and elongation of break) remains constant and/or such, wherein the combination of all three requirements is very advantageous for the long-term durability of the sealant.

Thus, according to an exemplary method, the sealant is fluid enough to flow into gaps and surface cavities formed during application of the add-on, and to ensure a smooth finish.

The sealant offers one or more of the following properties: The sealant has
- a surface tension being lower than the surface free energy of the blade surface and/or
- a sufficient resistance to peel forces occurring on the respective surfaces over the entire service life of the blade, especially bigger than 2 N/mm, and/or
- a tensile strength of bigger than 4 MPa and/or smaller than 8 MPa, and/or
- an elongation at break bigger than 80% and/or smaller than 130%, and/or
- a Young's Modulus bigger than 8 MPa and/or smaller than 150 MPa, and/or
- a maximum particle size of contained filler particles, filler agglomerates and/or of gel particles limited to max. 200 µm.

According to an exemplary method, before dispensing of the sealant on the application area, a filler is first applied along the longitudinal add-on edge, wherein the filler is a quick-setting adhesive and/or a high-viscosity adhesive, and the sealant is applied over the cured or hardened filler.

According to an exemplary method, the sealant comprises the same material as an adhesive used for fixing the add-on on the rotor blade surface.

A preferred sealing material has a good sandability, so that a smooth, aerodynamically advantageous surface can be produced. Therefore, the maximum size of solid particles (e.g. filler particles, agglomerates of filler particles, gel particles) in the sealing material both in its liquid as well as hardened or cross-linked state is limited to max. 200 µm, limited to max. 100 µm, particularly limited to max. 60 µm or even limited to max. 50 µm, especially determined according to DIN EN 21 524 or ISO 1524.

The inventive method of aerodynamically optimizing the edges of an add-on is not limited to aerodynamic devices such as LEP covers. The add-on may be a plate comprising sensors, e.g. a flexible plate that conforms to the curved surface of the rotor blade. The fixation of such a sensor plate to the rotor blade surface benefits from the sealing concept of the present invention, achieving improvements in respect of AEP and noise generation. Such a plate may be attached to the rotor blade surface at any position between the leading edge and trailing edge of the rotor blade, and may be mounted on the suction side or the pressure side of the rotor blade.

An edge seal is formed along the longitudinal edge of such a plate, using the inventive method. In this way, neither the upwind or windward edge (i.e. the edge that is closer to rotor blade leading edge) nor the downwind edge (the edge that is closer to the rotor blade trailing edge) of such a plate will adversely affect the laminar airflow over the rotor blade surface. So the present invention is not limited to shells or aerodynamic devices but also includes any kind of sensors mounted on e.g. a base plate on the blade surface, e.g. a flexible plate. Thus, improvements in respect of AEP are also possible for plates like sensor plates as well as reducing noise generated when mounting such on a blade surface.

As an example, the edge step height (shell height) of an add-on may be anywhere between 0.7 to 1 mm. The edge step height of an add-on is the sum of the thickness at the outer edge of the add-on plus the thickness of any adhesive or bonding layer used to attach the add-on to the rotor blade. In this case, the minimum width (extent) of the edge sealing for this add-on would be between 14 to 20 mm. For an edge step height of 0.7 mm, the minimum width of the edge sealing is e.g. 14 mm. For an edge step height of 1.0 mm, the minimum width of the edge sealing is e.g. 20 mm.

The ratio of edge seal width to step height can vary between 20:1 to 100:1. For the example edge step height range of 0.5 mm-1.5 mm, the edge seal would be at least 10 mm wide, and up to 150 mm wide. Such relatively wide edge seals for rotor blade add-on parts have been observed (in wind tunnel tests) to result in an improved aerodynamic behavior.

A further exemplary embodiment of the present invention is based on the insight that the laminar nature of the airflow over the rotor blade surface can be preserved by forming the edge seal over the longitudinal edge of the add-on, i.e. by having the edge seal "overlap" the outer surfaces of both the add-on and the rotor blade. In a further exemplary embodiment of the present invention, therefore, the method comprises a step of determining an overlap width for the edge seal, in a region of the add-on surface next to its longitudinal edge. The term "overlap width" shall be understood to mean the width of the edge seal portion that extends onto the surface of the add-on. The overlap width is determined on the basis of the add-on height.

The step of forming the edge seal then comprises applying the sealant material also onto an overlap region of the add-on part. The overlap of the edge seal can advantageously form a smooth layer over the edge of the add-on. Thus, according to an exemplary method, the sealant is formed to overlap the edge of the add-on.

In the inventive method, the edge seal width and overlap width for an edge seal are "tuned" to a specific add-on in order to prevent or at least significantly delay the onset of flow transition from laminar to turbulent on the surface of the blade behind the edge of the add-on, i.e. downwind of the add-on. The extent (i.e. width) of the edge sealing and the extent of any overlap will be governed by the height of the edge step at the longitudinal edge of the add-on.

The ratio of overlap width to step height can vary from 10:1 to 50:1. For the example edge step height of 0.5 mm, the overlap width would be 5 mm-25 mm wide. For an edge step height of 1.5 mm, the edge seal width would be 15-75 mm wide. The recommended ratios described above are significantly larger than typically used by solutions known in the art. The maximum possible width or extent of an edge sealing may also be determined or limited by a curvature of the rotor blade.

The edge sealing proposed herein may be achieved by using a sealing agent (sealant) or adhesive with sufficiently low viscosity, to be fluid enough to flow into any gaps and surface cavities formed during application of the add-on, and to ensure a smooth finish. However, since the viscosity of the adhesive/sealant will determine the minimum height of the edge seal along its outer boundaries, the sealant material is also chosen such that a smooth transition to the blade surface is assured.

At the same time the viscosity of the adhesive/sealant drives the step in the simple edge sealing and in the overlapping edge sealing. The overlapping edge sealing may be able to eliminate a step by forming a smooth layer over the shell edge. The edge sealing material is chosen such that a smooth transition to the blade surface is assured.

For large edge steps, a filler material may be used to augment the edge seal. In such an exemplary embodiment of the present invention, filler material is applied along the edge of the add-on to reduce the edge step initially, i.e. to form a compact wedge or slope extending outward from the add-on edge. The sealant material is then applied over the filler. The filler material may have a higher viscosity than the sealant material to facilitate an easy build-up of the filler or bottom layer to a finite thickness. The extent (width) of the filler is less than the width of the edge seal width in order to ensure that there is a uniform layer of edge sealer on the surface to enable a smooth edge at the end of the edge seal, i.e. a smooth transition to the rotor blade surface. The volume occupied by the filler material may be less than half the intended volume of the edge seal.

At a wind turbine rotor blade, an add-on part comprises any of a leading edge protective cover, a trailing edge panel, a vortex generator panel, a plate or a sensor panel. Other possibilities are listed above.

At a wind turbine rotor blade, the thickness of the add-on part at its longitudinal edge is in the range 0.5 mm to 1.5 mm.

Advantageously, the inventive arrangement and method reduces the aerodynamic performance impact of steps or other obstacles on the surface of a blade (e.g. occurring from the application of LEP) by reducing/avoiding an edge step. The solution also enables the use of LEP shells or LEP covers with a higher edge thickness. This enables a significant opportunity for cost reduction for the shells as the requirement of a thin edge is the cost driving factor in the manufacturing of these shells. Avoiding thinner shell edges also reduces the risk of wrinkling during application which further contributes to reduction of non-conformance cost and improves aerodynamic performance.

The edge sealing method described above contributes to the aerodynamic performance improvement of the LEP solution. The edge sealing indirectly enables the use of a shell with a thicker edge with contributes to the reduction of cost of the shell and non-conformance cost.

An overlap finish is created with a proper material to smoothen the transition to the blade surface.

BRIEF DESCRIPTION

Some of the embodiments will be described in detail, with reference to the following figures, wherein like designations denote like members, wherein.

DETAILED DESCRIPTION

In the diagrams, like numbers refer to like objects throughout. Objects in the diagrams are not necessarily drawn to scale.

Figure 1:
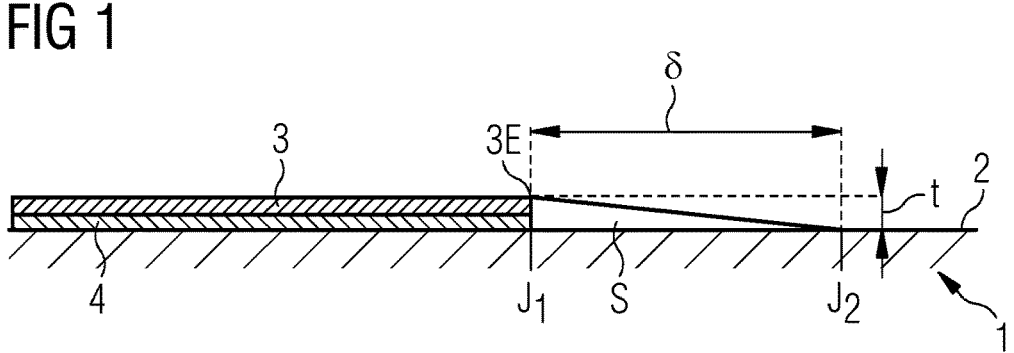
FIG. 1 depicts an embodiment of the inventive edge seal applied to the longitudinal edge of a rotor blade add-on, which is a panel.

FIG. 1 shows an embodiment of the inventive edge seal S applied to an add-on 3, which can be any of a LEP cover, a shell, a TE cover, a VG panel, a TE panel, a sensor panel, etc. The add-on 3 is attached to the outer surface 2 of the rotor blade 1 by an adhesive bonding layer 4. For the purpose of discussion, the adhesive layer 4 may be regarded as an element of the add-on 3. The height t of the add-on 3 at its edge step 3E is the sum of the thickness of the add-on 3 and the thickness of the adhesive layer 4. The add-on edge 3E may be assumed to run in a longitudinal direction of the rotor blade 1. The diagram clearly shows the "step" shape at the edge 3E of the add-on 3. Using the inventive method, an edge seal S is formed along the add-on edge 3E. The edge seal S commences at a first point J1 at the add-on edge 3E and extends to a second point J2, whereby the height t of the seal S gradually decreases from a maximum at point J1 to a minimum at point J2. The ratio of the height t and the width $\delta$ of the edge seal S $\delta$:t is at least 20:1. The volume of the edge seal S in this case is the cross-sectional area of the edge seal S, i.e. $(t \cdot \delta)/2$, multiplied by the length of the seal S, e.g. the length of the longitudinal edge 3E of the add-on 3.

Figure 2:
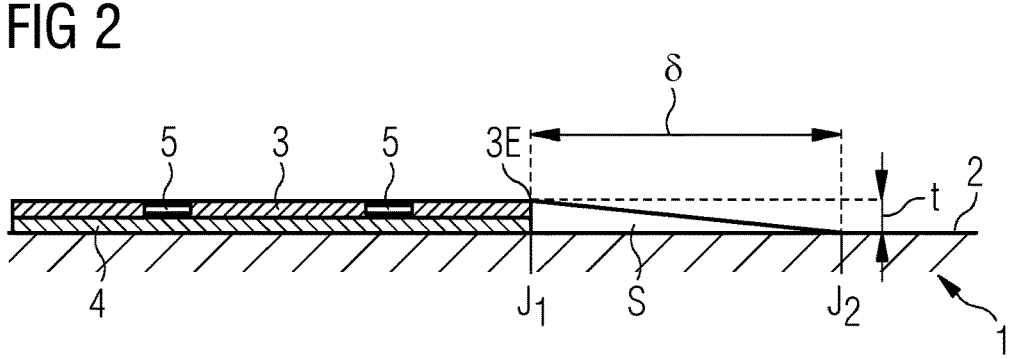
FIG. 2 depicts a further embodiment of the inventive edge seal sealing a plate.

FIG. 2 shows an embodiment of the inventive edge seal S, applied to an add-on 3 as shown in FIG. 1, wherein the add-on 3 here is a sensor panel covered with sensors 5.

Figure 3:
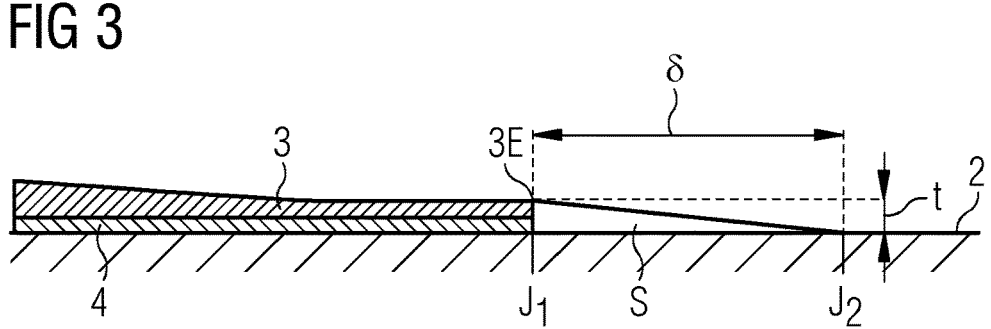
FIG. 3 depicts a further embodiment of the inventive edge seal sealing a cover.

FIG. 3 shows an embodiment of the inventive edge seal S, applied to an add-on 3 as shown in FIG. 1, wherein the add-on 3 here is a cover, e.g. a LEP cover.

FIG. 2 shows a further embodiment of the inventive edge seal S. Here, the edge seal S is applied to a longitudinal edge 3E of an add-on 3, in this case e.g. an LEP cover mounted about the leading edge of a rotor blade 1. In this exemplary embodiment, the edge seal S overlaps the longitudinal edge 3E of the add-on 3, i.e. the edge seal S commences at point J0 and extends to point J2. The total width $\delta 1$ of the edge seal S is therefore the width h of the overlap $S_O$ extending from point J0 to point J1, and the remaining edge seal width $\delta$ extending from point J1 to point J2. In this embodiment, the height of the edge seal S gradually increases from a minimum at point J0 to a maximum at point J1, and gradually decreases from the maximum at point J1 to a minimum at point J2. The height of the seal S at its maximum may exceed the height of the add-on edge 3E by up to 2.0 mm, depending on the overlap width h and/or on the edge seal width $\delta$ between point J1 and point J2. This height is based on the controlled layer thickness of the sealant or adhesive applied using a tool such as a spatula.

Thus, the extent $\delta$ of the edge seal S and the extent of the overlap h are dependent on the height t of the edge step 3E at junction J1. The ratio of $\delta$ and h with respect to t can vary anywhere between 20:1 to 100:1 ($\delta$) and 10:1 to 50:1 (h) respectively. The edge seal S and overlap extents are tuned in order to prevent/delay the onset of flow transition from laminar to turbulent on the surface of the rotor blade 1 due the edge step 3E. The recommended ratios are longer than typically used by solutions known in the art.

By example in respect of the figures (FIG. 4 in particular) the height t of the edge step 3E can be anywhere between 0.5 to 1.5 mm, 0.7 to 1 mm, which means that the minimum extent of the edge seal S would be at least 12 mm, e.g. between 12 to 70 mm, 14 to 50 mm, more 14 to 40 mm and most 14 to 20 mm.

The extent $\delta$ of the edge sealing is dependent on the curvature of the rotor blade 1 which puts a maximum on the extent of the edge seal S.

A edge seal S may use a sealant with a viscosity to make the adhesive/sealant fluid enough flow into the gaps and surface crevices formed due to the application and ensure a smooth finish. At the same time the viscosity of the adhesive/sealant 4 drives the step at junction J2 in the simple edge sealing S and at J0 and J2 in the overlapping edge seal $S_O$. The overlapping edge seal $S_O$ may be able to eliminate the step at J1 forming a smooth layer over the shell edge 3E. The sealant is chosen such that a smooth transition to the blade surface 2 is assured.

Figure 4:
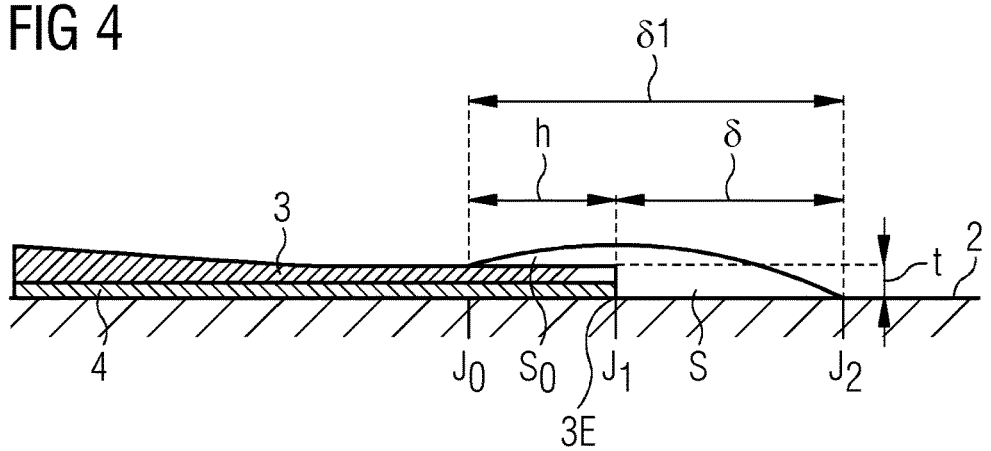
FIG. 4 depicts a further embodiment of the present invention comprising overlapping edge sealing.
Figure 5:
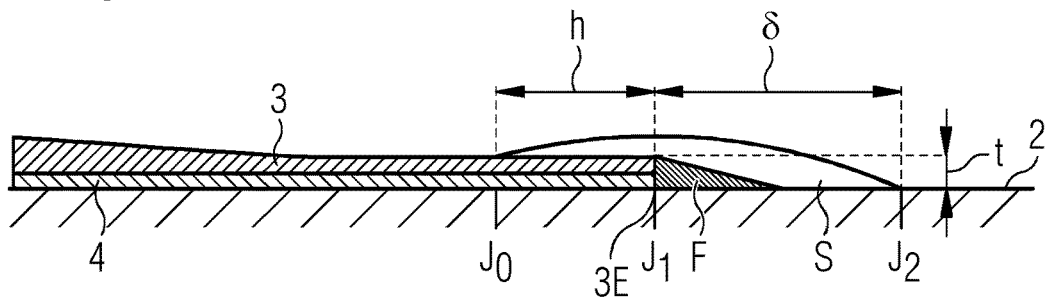
FIG. 5 depicts an embodiment of present invention comprising overlapping edge sealing with filler material.

FIG. 5 shows a further embodiment of the inventive edge seal S. Similarly to the edge seal S of FIG. 4, the edge seal S in this case extends over a filler material F (herein also referred to as filler F) that is first applied along the longitudinal add-on edge 3E. The filler F may be a quick-setting adhesive and/or a high-viscosity adhesive/sealant. The filler F can be applied to form a wedge with straight sides that are shorter than the height of the add-on 3. In a subsequent step, sealant material is applied over the cured or hardened filler F such that the resulting edge seal S overlaps the longitudinal edge 3E of the add-on 3, commencing at point J0 and extending to point J2. In this case also, the total width $\delta$ of the edge seal S is measured from point J0 to point J2. As described in FIG. 2 above, the height of the seal S gradually increases from a minimum at point J0 to a maximum at point J0, and gradually decreases from the maximum at point J1 to a minimum at point J2. The filler F shown here could also be used in the other embodiments.

Thus, for large edge steps, the filler F may be used to reduce the edge step initially and the edge sealer can be applied subsequently. The filler material F may have a higher viscosity than the material of the edge seal S in order to enable an easy build-up of the bottom layer to a finite thickness. The extent of the filler F will be less than $\delta$ in order to ensure that there is a uniform layer of edge sealer on the surface to enable a smooth edge at Junction J2.

Embodiments shown in FIGS. 3 to 5 may also comprise a panel, e.g. a VG panel or TE panel (trailing edge panel) instead of a cover. The cover may be e.g. an LEP or TE edge cover.

Figure 6:
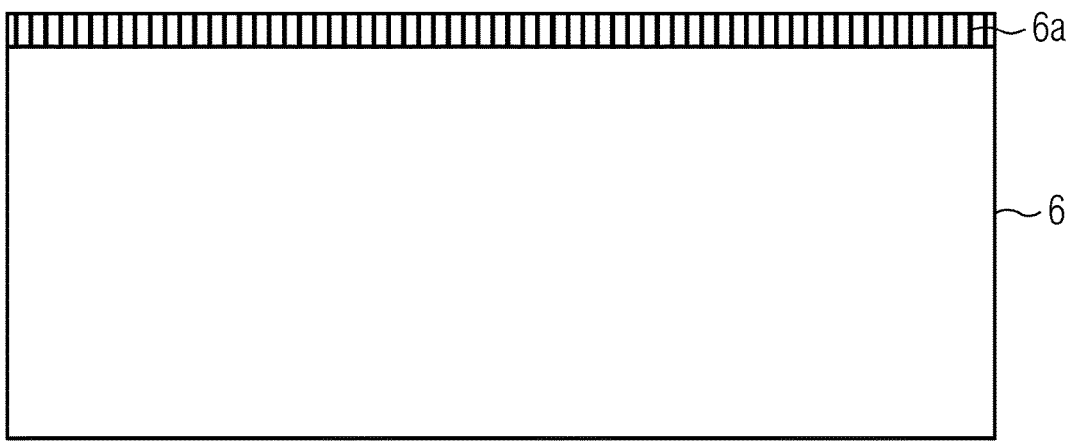
FIG. 6 depicts a tooth spatula.

FIG. 6 shows a flexible tooth spatula 6 with a row of teeth 6a. This tooth spatula 6 is used as preliminary tool 6 to spread the sealant material in a region bounded by the longitudinal edge of the add-on part 3 and the chosen edge seal width $\delta$. The preliminary tool 6 has a flexibility and shape that facilitates the initial spreading of the sealant. This is achieved with the teeth 6a. The tooth distance lies between 1 to 2 mm and the tooth height is about 0.2 to 5 mm.

Figure 7:
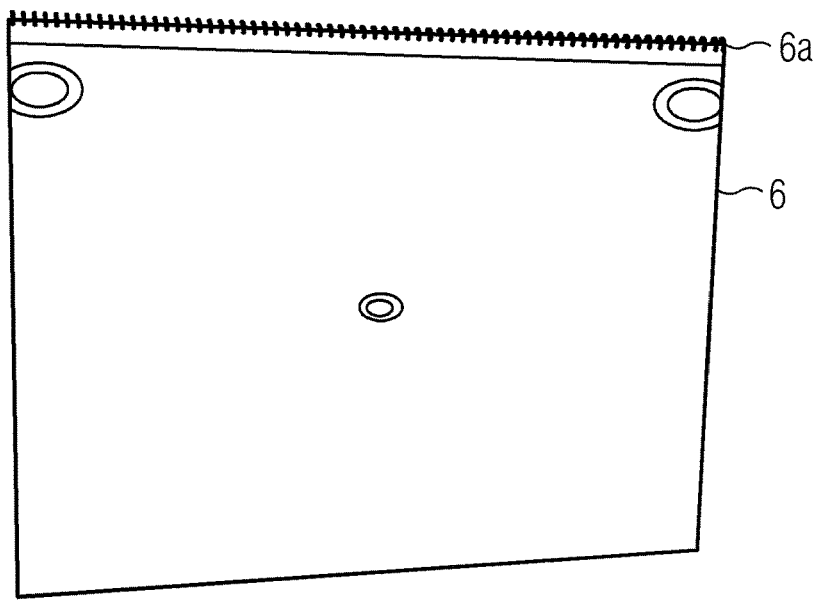
FIG. 7 depicts another view of a tooth spatula.

FIG. 7 shows another view of a tooth spatula as shown in FIG. 6 made of a flexible material and used for adhesive levelling.

Figure 8:
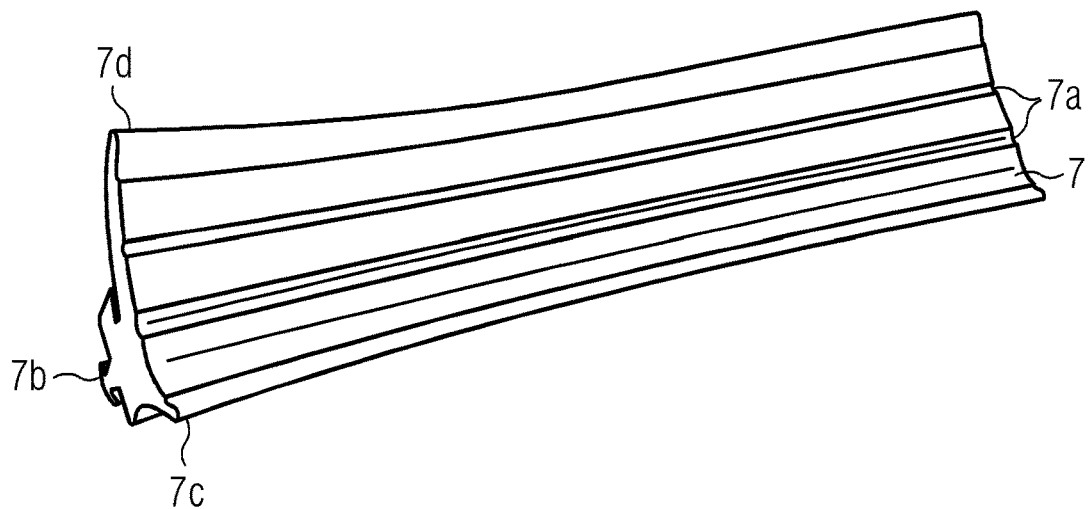
FIG. 8 depicts a smoothening tool.

FIG. 8 shows a smoothening tool 7 in form of a refining spatula 7 that is used to refine the shape of the sealant spread by the preliminary tool 6. The refining tool has a lower hardness than the preliminary tool.

Figure 9:
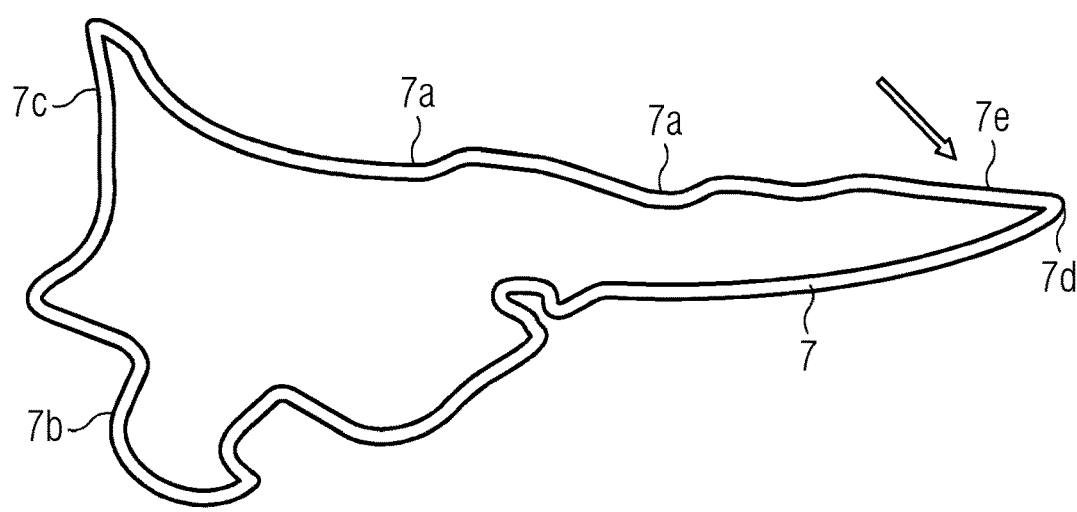
FIG. 9 depicts a profile of the smoothening tool of FIG. 8.

FIG. 9 shows a profile of the smoothening tool of FIG. 8 indicating the contact area 7e with sealant/adhesive during smoothening (arrow).

FIGS. 8 and 9 show a spatula with a number of grooves 7a running parallel to the tip 7d of the spatula (perpendicular to the direction of smoothening). These grooves 7a have the advantage that the refining spatula 7 is rigid in the direction of the grooves 7a but may easily bend when sweeping over a surface. For a better grip, a refining spatula 7 has two fins 7b, 7c at the opposite end of its tip 7d, wherein the fin 7c at the side of the contact area 7e is thinner than the fin at the other side.

Figure 10:
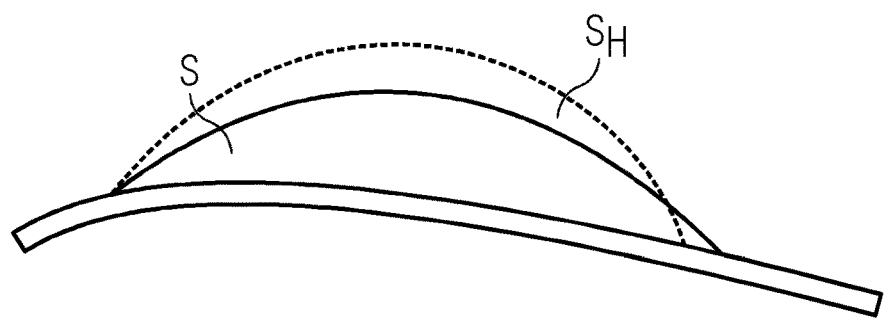
FIG. 10 depicts a smoothening and distribution of sealant with a soft and a hard tool.

FIG. 10 shows the smoothening and distribution of a sealant with a soft spatula/tool 7 versus a hard spatula/tool. When using a soft refining spatula 7, the resulting edge seal S will be flatter and wider (solid line) than an edge seal $S_H$ smoothened with a hard tool (dashed line).

Figure 11:
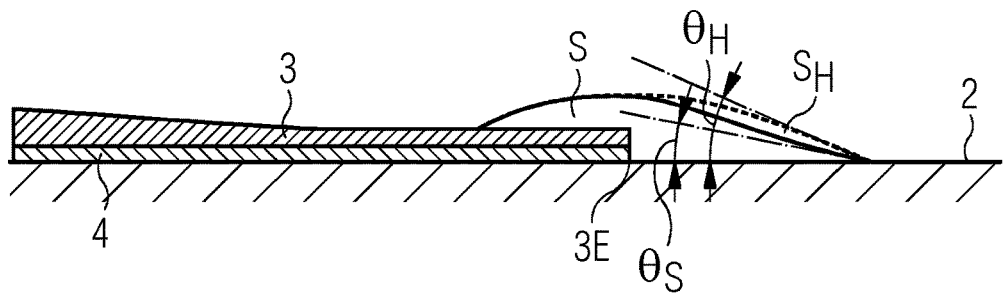
FIG. 11 depicts a smoothening and distribution of sealant sealing the edge of an add-on finished with a soft and a hard tool.

FIG. 11 shows the smoothening effect of FIG. 10 at an edge seal S of an add-on 3. Again, the dashed line shows the edge seal $S_H$ made with a hard tool, the solid line the edge seal S made with a soft refining spatula 7 (for the spatula see e.g. FIG. 8). Shown are angles between the blade surface 2 and the sealing made with a hard spatula (angle $\theta_H$) and the soft refining spatula 7 (angle $\theta_S$). It can easily be seen that the angle $\theta_H$ between the blade surface 2 and the sealing made with a hard spatula is much bigger than the according angle $\theta_S$ made with the soft refining spatula 7.

From wind tunnel measurements, it has been observed that the angle θ between blade surface 2 and edge seal S (sealing edge angle) plays a vital role in the performance of the sealing concept. The lower the sealing edge angle θ, the better the performance of the sealing.

A soft spatula yields a lower sealing edge angle compared to a harder (stiffer) spatula as the spatula is able to bend more locally towards the point where the sealing ends and the blade surface starts. Hence, the impact sealing edge angle θ is a direct function of the spatula hardness (stiffness). Hence a spatula with a suitably low hardness is chosen.

Figure 12:
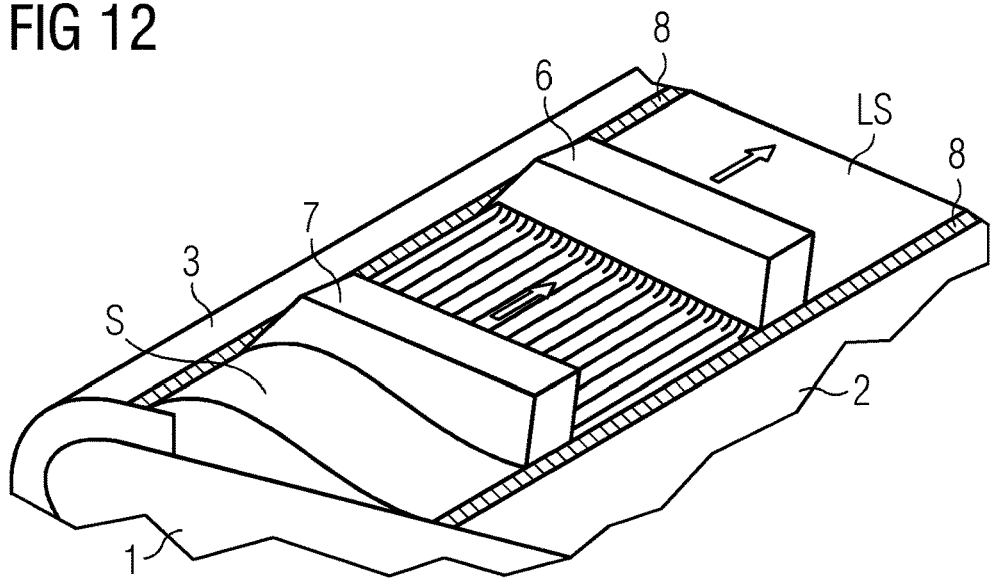
FIG. 12 depicts an example for the smoothening of an edge seal.
Figure 13:
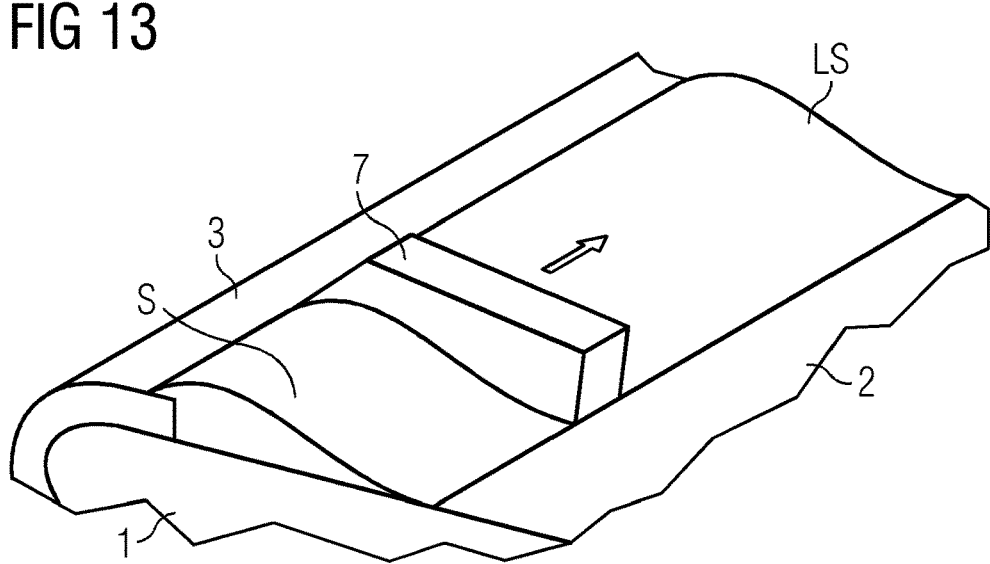
FIG. 13 depicts a final smoothening of an edge seal.

FIGS. 12 and 13 show an add-on 3 attached to a rotor blade surface 2 and the forming of an edge seal S with a method according to the embodiment of the present invention. The add-on 3 may be attached using an adhesive 4 as explained above (the adhesive not shown here). Liquid sealant LS is applied on the surface 2 of a blade 1 in the region of the edge step 3E of an add-on 3.

FIG. 12 shows the steps spreading the liquid sealant LS using a preliminary shaping tool 6 and smoothing the sealant with a flexible tool 7. FIG. 13 shows the final smoothening of the sealant LS.

Prior to applying the sealant LS the area of the intended edge seal is delimited by using a smooth, thin masking tape 8. One tape 8 may extend along the outer edge of the intended edge seal 51, at a distance outward from the edge step 3E. This distance is at least 20 times larger than the edge step height. The thickness of the tape 8 is as small as possible, at most 0.2 mm. The other boundary of the edge seal 51 may be defined by the edge step 3E. Alternatively, if an overlap is to be formed over the edge step 3E, a second tape 8 may be applied to the surface of the add-on 3, parallel to the longitudinal edge of the add-on 3. The sealant LS is then applied within these bounds. The sealant LS can initially be roughly deposited on the surface 2 of the rotor blade 1 and add-on 3, for example in the form of a bead from a dispenser nozzle, or by spraying.

The roughly applied sealant LS is then spread using a preliminary shaping tool 6, for example a flexible toothed spatula 6. This can be done by guiding the toothed spatula 6 in the longitudinal direction of the rotor blade surface 2, between the edge seal bounds. The flexibility of the preliminary shaping tool 6 is such that it can be bent in both axial directions to facilitate spreading of the sealant S.

After distribution of the sealant LS (before removing the masking tapes 8), the sealant LS is smoothed with a, flexible, tool 7 moved in the longitudinal direction of the blade 1.

After this preliminary step (FIG. 12) is complete, the tapes 8 are removed (see FIG. 13). The still-liquid sealant LS is then smoothed to its final shape by drawing a softer finishing tool 7, e.g. a flexible refining spatula 7, over the spread sealant LS. This refining or smoothing step with the smoothening tool 7 serves to further decrease the height of the "wedge" of the edge seal Si between the edge step 3E and the outer boundary of the edge seal S. The refining spatula 7 is made of a material such as silicone to ensure a relatively low Shore A hardness, for example 50±10 so that it can be curved as desired during spreading of the sealant in order to achieve the desired edge seal profile shape.

By using the refining tool 7, the still-soft liquid sealant LS is shaped as desired, e.g. as shown in FIG. 4 or 5, to form an overlap $S_O$ alongside the long edge 3E of the add-on 3.

Although the present invention has been disclosed in the form of exemplary embodiments and variations thereon, it will be understood that numerous additional modifications and variations could be made thereto without departing from the scope of the present invention.

For the sake of clarity, it is to be understood that the use of "a" or "an" throughout this application does not exclude a plurality, and "comprising" does not exclude other steps or elements.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for creating a transition from an edge of an add-on part mounted on an outer surface of a rotor blade, the method comprising:
    delimiting an application area on the outer surface and the add-on part to be covered by a sealant compound with a thin and smooth masking tape;
    dispensing of the sealant compound on the application area;
    distributing the sealant compound;
    removing the masking tape; and
    smoothening a sealant transition step with a flexible tool.

2. The method according to claim 1, wherein the sealant compound is formed to overlap the edge of the add-on.

3. The method according to claim 1, wherein the distributing the sealant compound is achieved by using a toothed spatula of a flexible material, for levelling the sealant compound after the sealant compound has been dispensed to the application area, further wherein teeth of the toothed spatula have a distance between 1 to 2 mm and/or a height between 0.2 to 5 mm.

4. The method according to claim 1, wherein the flexible tool is a second spatula, with a Shore A hardness bigger than 30 and/or smaller than 70.

5. The method according to claim 1, wherein the flexible tool comprises a silicone material, with a cross-section profile adapted to the application and a low energy surface preventing adhesion of the sealing material.

6. The method according to claim 1, wherein the flexible tool comprises a tip where there is an intended contact area with the sealant compound, and a number of grooves running parallel to the tip and/or a number of fins at an opposite end of the tip.

7. The method according to claim 1, wherein the masking tape has a thickness less than 0.2 mm.

8. The method according to claim 1, wherein the dispensing of the sealant compound is achieved by bead or spray application, by roll application or using a swirl process, by application of the sealant compound in a serpentine line overlapping transition, on both the add-on and the outer surface, or in a straight line on the add-on and/or the outer surface.

9. The method according to claim 1, wherein after distributing the sealant compound and before removing the masking tape, the sealant compound is smoothed with a tool, moved in a longitudinal direction of the blade, further wherein the tool is designed to meet a profile of the blade, with a curvature that matches that of a blade leading edge profile.

10. The method according to claim 1, wherein the sealant compound is fluid enough to flow into gaps and surface crevices formed during application of the add-on, and to ensure a smooth finish, further wherein:

the sealant compound has a surface tension being lower than a surface free energy of the blade surface; and/or the sealant compound has a sufficient resistance to the peel forces occurring on respective surfaces over an entire service life of the blade, bigger than 2 N/mm, and/or the sealant compound has a tensile strength of bigger than 4 MPa and/or smaller than 8 MPa; and/or the sealant compound has an elongation at break bigger than 80% and/or smaller than 130%; and/or the sealant compound has a Young's Modulus bigger than 8 MPa and/or smaller than 150 MPa; and/or the sealant compound has a maximum size of solid particles, filler particles, agglomerates of filler particles, gel particles, in the sealing material both in a liquid as well as hardened or cross-linked state is limited to max. 200 μm.

11. The method according to claim 1, wherein before dispensing of the sealant compound on the application area a filler is first applied along the edge, further wherein the filler is a quick-setting adhesive and/or a high-viscosity adhesive, and the sealant compound is applied over the cured or hardened filler.

12. The method according to claim 1, wherein the sealant compound comprises a same material as an adhesive used for fixing the add-on on the outer surface.

* * * * *